Patented May 18, 1926.

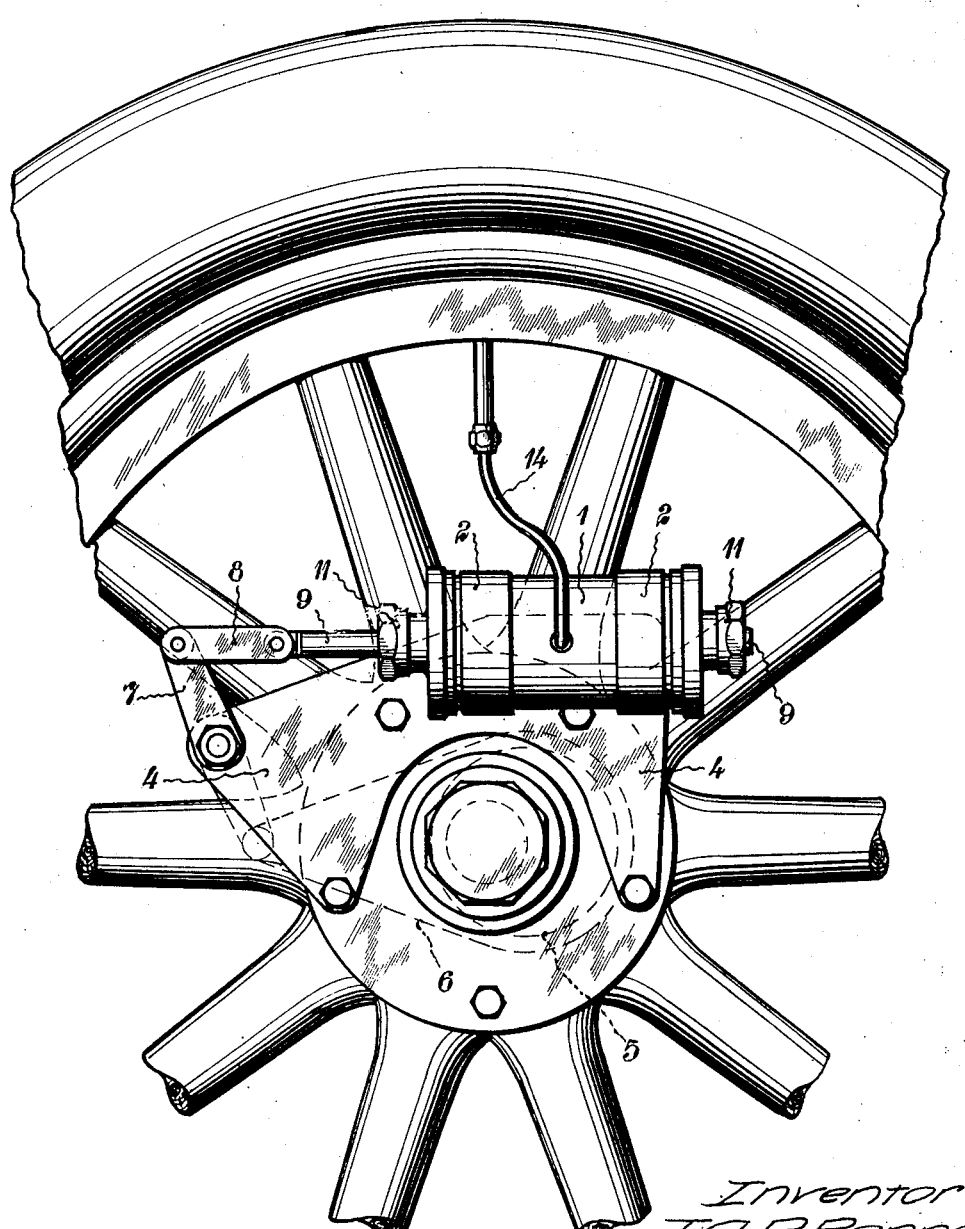

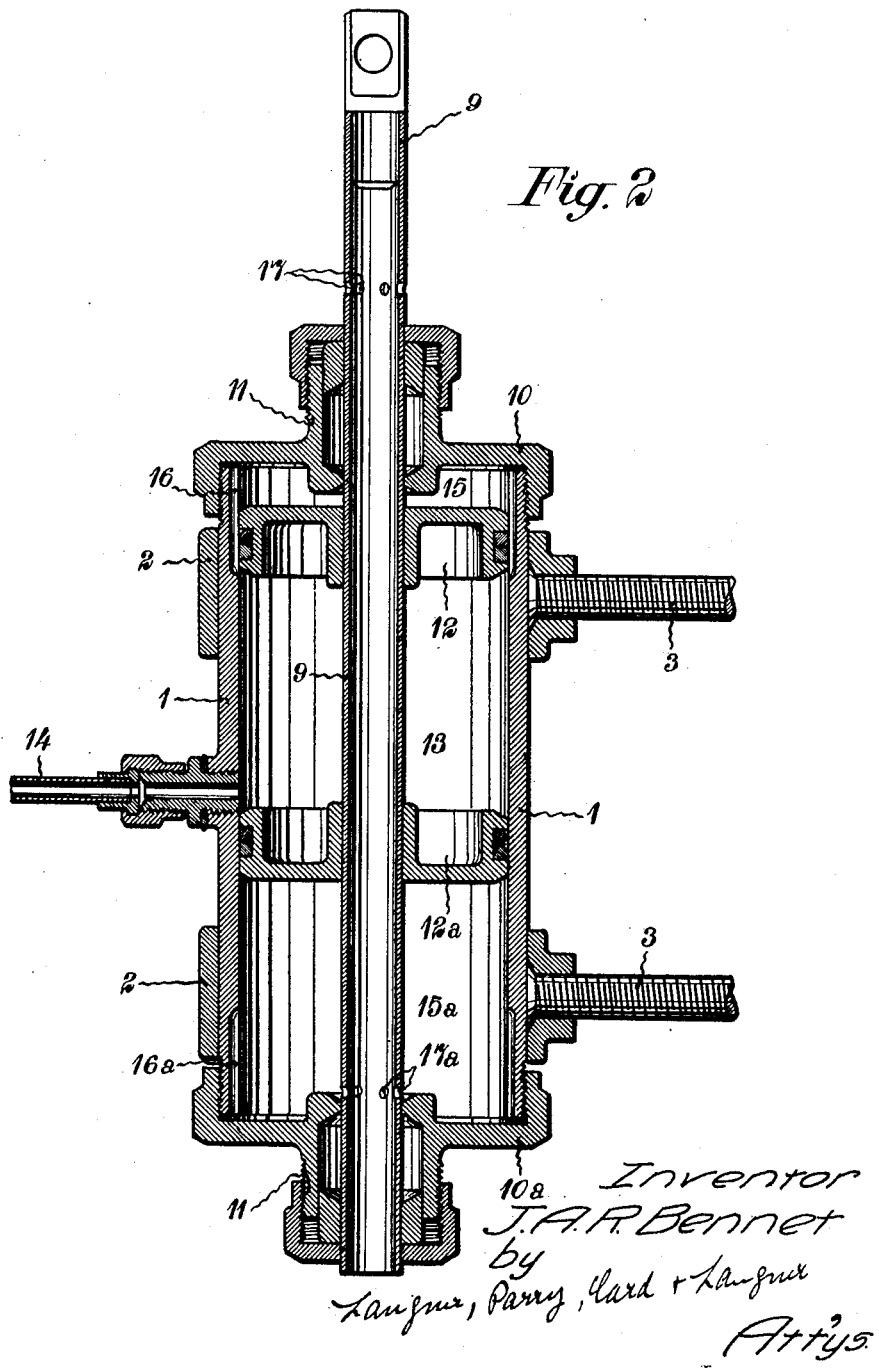

1,585,181

UNITED STATES PATENT OFFICE.

JULES AXEL RUTGER BENNET, OF STOCKHOLM, SWEDEN.

DEVICE FOR MAINTAINING A CONSTANT PRESSURE IN CONTAINERS.

Application filed December 31, 1925. Serial No. 78,655.

The invention relates to a device for maintaining a constant pressure in a container.

Primary objects of the present invention are to provide improved operating or controlling means for a pump mechanism by which a constant pressure is maintained in a container.

Although the device finds its application in connection with various apparatus it is for the sake of simplicity and by way of example described in the following in connection with a container which is constituted by a pneumatic tire for vehicle-wheels.

It is of the utmost importance for the durability of such pneumatic tires to maintain a constant pressure therein, as otherwise the tires become damaged or easily worn, if they are not inflated to the proper degree. Not only too high pressure but also too low pressure is unsuitable. The pressure, however, does not remain constant as is well known, but has the tendency to decrease on account of leakage or to increase on account of the heating of the tires caused by friction during service or by the tires being subjected to the influence of strong sunshine. When a vehicle is in service the tires, if a constant pressure is to be maintained therein, must therefore alternatively be inflated and deflated to a certain extent. In order to effect a certain discharge of air when the pressure in the tire is too high, it appears quite obvious and has already been proposed to employ a safety-valve, but such valves do not appear to work fully satisfactorily. For pressing air into the tires during the run of the vehicle it has also been proposed to provide an air-pump mounted to the vehicle-wheel and driven by the rotation of the latter.

The present invention has for its object a similar device, in which the pump, however, is so arranged that it, driven by the rotation of the vehicle-wheel, pumps air into the tire only in case the pressure therein is not sufficient, and pumps air out of the tire in case the pressure therein is greater than desired, and is inoperative or with other words does neither pump air into the tire nor out of the same, as long as the pressure therein has the desired greatness. By this means is provided a device which absolutely reliably and automatically maintains the desired constant pressure in the tire, when the vehicle is in service, thus increasing the durability of the tires and avoiding all the well known disadvantages deriving from too much or too little inflated tires.

In the accompanying drawings the invention is shown as carried out by way of example in connection with vehicle-wheel tires. Figure 1 is a side elevation of a portion of a vehicle wheel having a pneumatic tire and fitted with a pump mechanism according to the invention. Figure 2 is a longitudinal section through the pump mechanism.

The pump cylinder 1 is securely fixed by means of suitable straps 2 and fastening bolts 3 to a plate 4 fastened to the hub of the vehicle-wheel. The axle of the vehicle-wheel carries an eccentric 5 having an eccentric strap 6 the free end of which is pivotally connected to the one end of a double-armed lever 7 pivotally mounted on the plate 4. The other end of the lever 7 is pivotally connected by means of a link 8 to the end of the hollow piston rod 9 of the pump 1, so that the piston rod reciprocates in the pump cylinder, when the vehicle-wheel rotates. This driving device for the pump, however, is only to be considered an example, and obviously the pump may be operated in various different manners.

The pump cylinder is provided at both its ends with cylinder covers 10, 10ª having stuffing boxes 11, through which the tube-like piston rod 9 passes. Within the cylinder 1 the piston rod has two pistons 12, 12ª fixed thereto in spaced relation at a distance corresponding to about half the length of the interior of the cylinder, so that a central space 13 is formed within the cylinder between the pistons, which space always is in communication with a conduit 14 attached to the center portion of the cylinder and in communication with the air space of the tire. The working spaces 15, 15ª between the cylinder covers 10, 10ª and the pistons 12, 12ª will be in communication with the central space 13, only when the pistons are near the end of their stroke near the cylinder cover, by means of correspondingly arranged longitudinal grooves 16, 16ª in the inner walls of the cylinder. At the same time as one of the outer cylinder spaces 15 or 15ᵃ is in communication with the central space 13 the other outer cylinder space 15ᵃ or 15 is in communication with the atmosphere through aperture 17ᵃ and 17 respectively passing through the walls of the tube-like piston rod 9, the open end of which is in communication with the atmosphere.

In operation, the device above described acts in the following manner:—Assuming the pump pistons to occupy the position shown in Fig. 2, atmospheric pressure is prevailing in the space 15ᵃ. The air contained therein will be compressed to a pressure corresponding to the dimensions and length of stroke of the pump, when the piston 12ᵃ moves to the end of its stroke near the cylinder cover 10ᵃ. On reaching this said end position the air, thus compressed passes through the grooves 16ᵃ into the central space 13 and thence to the air space of the tire, in case the pressure therein is lower than that in the space 15ᵃ, which latter pressure is determined, as aforesaid, by the dimensions and length of stroke of the pump piston or pistons. During the next stroke of the piston in the opposite direction similar conditions prevail with respect to the working space 15.

On the other hand, if the pressure in the tire and thus in the space 13 is higher than the pressure obtainable by the pump, and again assuming that the pistons occupy the position shown in Fig. 2, air will pass from the central space 13 through the grooves 16 into the space 15. In consequence thereof a pressure higher than that of the atmosphere is prevailing in this space 15, when the piston 12 has reached its inner end position, so that at this moment air is discharged through the apertures 17 into the atmosphere. Thus it is obvious, that the pump will gradually blow off air from the tire, assuming too high pressure is present in the tire, until the pressure in the latter is equal to the maximum compression pressure of the pump, and when this condition just mentioned has been reached, no air will pass from the spaces 15 and 15ᵃ to the space 13 during the movements of the pump, but the air in said spaces 15 and 15ᵃ will alternately be compressed and expand so as to have atmospheric pressure, the work necessary for the compression in the one space being compensated by the simultaneous expansion in the other space, so that under such conditions the resistance opposed to the movements of the pump is substantially confined to the friction in the device.

In conformity with the above stated facts the invention is characterized in that the pump with respect to its working space and the length of stroke of the pistons is so dimensioned and the working space is brought in communication with the atmosphere and the air space of the tire respectively by connecting channels positively controlled in such a manner that the working space is in pressure balancing communication with the atmosphere when the pistons are in the one end position of their stroke, and that consequently the air in the working space and having the same pressure as the atmosphere is compressed to that which it is desired to have in the tire during the stroke of the pistons toward their other end position. A further feature of the invention is that the working space is in pressure balancing communication with the air space of the tire when the pistons are in the last named end position, so that in accordance with the pressure therein air passes from the working space to the tire or from the latter to the working space. In the latter case the additional compressed air is discharged into the atmosphere, when the pistons again reach the first named end position. Thus, the pump blows off air from the tire when the pressure therein is above the desired pressure and pumps in air when the pressure is insufficient.

It is obvious that a device embodying the above named characteristic features according to the invention may be carried out in many different ways and, therefore, it is to be understood that the invention is not limited to the example shown and described, although this example appears to be particularly suitable for the contemplated purpose. Thus, for instance the pump need not necessarily be double-acting by means of two pistons, and further it is obvious that the connecting channels for bringing the spaces of the pump in communication with the atmosphere and the air space of the tire, positively controlled by the movement of the piston or pistons may be arranged in a different manner. It may further prove advisable to provide means for adjusting the compression pressure of the pump within certain limits, in order to render the device suitable for different types of tires having differently dimensioned air spaces or pressures. This may be carried into effect by modifying the position in relation to each other of the connecting channels leading to the atmosphere or the air space of the tire, or by adjusting mechanisms which serve to control said channels at the end positions of the piston or pistons. For instance, the apertures 17 leading to the atmosphere may be made displaceable or adjustable as to size in such a manner, that they, according to their displacement or adjustment are closed earlier or later with respect to the end position of the piston. As another example of a modification is to be added that the edge of the piston 12 controlling the access to the groove 16 may be made adjustable in such a manner that the same, in accordance with its adjustment brings the working space 15 in communication with the air space of the tire at an earlier or later stage of the movement of the piston or pistons.

What I claim and desire to secure by Letters Patent is:—

1. A device for maintaining a constant pressure in a container comprising a pump cylinder in communication with said container, piston means within said cylinder and fixed to a piston rod, driving means connected to and causing reciprocal motion of the piston rod and the piston means, channel means adapted to bring the spaces on both sides of the piston means in communication with each other when the piston means is near the one end position of its stroke and apertured means adapted to bring the space at the one side of the piston means in communication with the atmosphere when the piston means is near the other end position of its stroke.

2. A device for maintaining a constant pressure in a container comprising a pump cylinder in communication with said container, piston means within said cylinder and fixed to a hollow piston rod, channel means in the inner walls of the cylinder, driving means connected to and causing reciprocal motion of the piston rod and the piston means, said channel means being arranged to bring the spaces on both sides of the piston means in communication with each other when the piston means is near the one end position of its stroke, apertures through the walls of the hollow piston rod adapted to bring the space at the one side of the piston means in communication with the atmosphere when the piston means is near the other end position of its stroke.

3. A device for maintaining a constant pressure in a container comprising a pump cylinder in communication with said container, piston means within said cylinder and fixed to a hollow piston rod, channel means in the inner walls of the cylinder, driving means connected to and causing reciprocal motion of the piston rod and the piston means, said channel means being adapted to bring the spaces on both sides of the piston means in communication with each other when the piston means is near the one end position of its stroke, apertures in the wall of the hollow piston rod adapted to bring the space at the one side of the piston means in communication with the atmosphere when the piston means is near the other end position of its stroke.

4. A device for maintaining a constant pressure in a container comprising a pump cylinder for compressing air, a hollow piston rod extending through the cylinder covers, two pistons fixed to the piston rod and spaced apart so as to form a central space and two end spaces within the cylinder, the central space being in communication with said container, driving means connected to and causing reciprocal motion of the piston rod and the pistons, longitudinal grooves arranged on the inside walls of the cylinder at each end of the latter and adapted to effect communication between the central space and one of the end spaces when the pistons are near the one end of their stroke, apertures through the walls of the hollow piston rod and adapted to effect communication between the other end space and the atmosphere when the pistons are in the same position as above stated.

In testimony whereof, I have signed my name to this specification.

JULES AXEL RUTGER BENNET.